US010656691B2

(12) United States Patent
Kosugi et al.

(10) Patent No.: US 10,656,691 B2
(45) Date of Patent: May 19, 2020

(54) USER DETECTION APPARATUS, SYSTEMS, AND METHODS

(71) Applicant: LENOVO (Singapore) PTE. LTD., New Tech Park (SG)

(72) Inventors: Kazuhiro Kosugi, Yokohama (JP); Yuhsaku Sugai, Yokohama (JP); Noritoshi Yoshiyama, Yokohama (JP)

(73) Assignee: Lenovo (Singapore) PTE LTD, New Tech Park (SG)

( * ) Notice: Subject to any disclaimer, the term of this patent is extended or adjusted under 35 U.S.C. 154(b) by 185 days.

(21) Appl. No.: 15/647,021

(22) Filed: Jul. 11, 2017

(65) Prior Publication Data

US 2018/0018005 A1   Jan. 18, 2018

(30) Foreign Application Priority Data

Jul. 12, 2016   (JP) ................................ 2016-137465

(51) Int. Cl.
| | |
|---|---|
| *G06F 1/20* | (2006.01) |
| *G06F 1/3231* | (2019.01) |
| *G01V 9/00* | (2006.01) |
| *G05B 15/02* | (2006.01) |

(52) U.S. Cl.
CPC .............. *G06F 1/206* (2013.01); *G01V 9/005* (2013.01); *G05B 15/02* (2013.01); *G06F 1/3231* (2013.01); *G05B 2219/2642* (2013.01); *Y02D 10/173* (2018.01)

(58) Field of Classification Search
CPC .................... G01V 9/005; G05B 15/02; G05B 2219/2642; G06F 1/206; G06F 1/3231; Y02D 10/173
See application file for complete search history.

(56) References Cited

U.S. PATENT DOCUMENTS

| | | | | |
|---|---|---|---|---|
| 5,493,618 A * | 2/1996 | Stevens | .................. | G08C 23/02 381/110 |
| 5,946,209 A * | 8/1999 | Eckel | .................... | H01H 47/007 315/159 |
| 5,971,597 A * | 10/1999 | Baldwin | .................. | G01K 1/16 340/540 |
| 6,909,921 B1 * | 6/2005 | Bilger | .................... | G05B 15/02 700/14 |
| 8,033,686 B2 * | 10/2011 | Recker | ............... | H05B 33/0803 362/249.02 |
| 2006/0100820 A1 * | 5/2006 | Davidson | ............... | G01B 21/22 702/151 |

(Continued)

FOREIGN PATENT DOCUMENTS

| | | |
|---|---|---|
| CN | 102207512 A | 10/2011 |
| JP | 63003267 | 1/1988 |

(Continued)

*Primary Examiner* — Kidest Bahta
(74) *Attorney, Agent, or Firm* — Kunzler Bean & Adamson

(57) ABSTRACT

A user detection apparatus includes a processor for an information handling device and a memory that stores code executable by the processor. The code is executable by the processor to detect a user in a user space that is proximate to the information handling device in response to an airflow being detected in the user space and, in response to detecting the user, resume or begin operations in the information handling device.

20 Claims, 14 Drawing Sheets

(56) References Cited

U.S. PATENT DOCUMENTS

| | | | |
|---|---|---|---|
| 2006/0125624 A1* | 6/2006 | Ostrovsky | H05B 37/0227 340/527 |
| 2007/0085157 A1* | 4/2007 | Fadell | G06F 3/0304 257/428 |
| 2007/0219650 A1* | 9/2007 | Wang | G01F 1/6847 700/73 |
| 2010/0312498 A1* | 12/2010 | Hamann | G01F 1/6842 702/45 |
| 2015/0192442 A1* | 7/2015 | Olin | G01F 1/692 73/204.26 |
| 2016/0062332 A1* | 3/2016 | Call | G05B 19/042 700/276 |
| 2016/0116178 A1* | 4/2016 | Vega | F24F 11/52 700/276 |

FOREIGN PATENT DOCUMENTS

| | | |
|---|---|---|
| JP | 04072523 A | 3/1992 |
| JP | 0564992 U | 8/1993 |
| JP | 2563642 | 11/1997 |
| JP | 2007285996 A | 11/2007 |
| JP | 2005010152 A | 1/2013 |
| JP | 5541576 B | 7/2014 |
| JP | 2016039447 A | 3/2016 |
| WO | 2008020893 A1 | 2/2008 |
| WO | 2014021033 A1 | 2/2014 |

* cited by examiner

USER DETECTION APPARATUS, SYSTEMS, AND METHODS

CROSS-REFERENCE TO RELATED APPLICATIONS

This application claims priority to Japan Patent Application No. 2016-137465 filed on Jul. 12, 2016 for Kosugi et al., the entire contents of which are incorporated herein by reference for all purposes.

FIELD

The various embodiments relate to apparatus, systems, and methods that can detect the presence and/or proximity of a human to an information handling device and/or system.

BACKGROUND

Many types of electronic devices, such as interactive computers and acoustic devices, provide services to nearby users. In the absence of a user, these electronic devices are typically in a standby mode to save power consumption. Since it is inconvenient to request a user to perform some operations when beginning and/or resuming the use of an electronic device, efforts have been made to use various sensors for enabling a device or system to detect the presence of a user.

Japanese Patent Application Publication No. 2016-039447 describes a technique for preventing an image output device from transitioning to a power saving mode regardless of the presence of a nearby user using the image output device. This technique uses an infrared array sensor to switch power modes.

Japanese Patent Application No. 2014-72523 describes a flow sensor. Here, the flow sensor includes a heater element and a pair of temperature sensor resistive elements disposed on both sides of the heater element.

Japanese Patent Application No. 2007-285996 describes a thermal sensitive acceleration sensor. Here, the thermal sensitive acceleration sensor includes two pairs of temperature detecting elements sandwiching a heater in closed space that detects temperature differences caused by acceleration.

Active-type user detection sensors that emit infrared rays, ultrasonic waves, light, or the like toward a human to detect the presence of a human based on a response thereof, consume large amounts of power. A user detection sensor using a camera also consumes a large amount of power. In addition, the use of a camera for user detection often tends to be unfavorable by users for privacy reasons. Further, some user detection sensors may not be effective because they are only capable of detecting a human within a limited range and/or direction.

BRIEF SUMMARY

Various embodiments provide user detection apparatus and systems. Further embodiments provide methods and computer program products related to such user detection systems.

In one embodiment, a user detection apparatus includes a processor for an information handling device and a memory that stores code executable by the processor. The code is executable by the processor to detect a user in a user space that is proximate to the information handling device in response to an airflow being detected in the user space and, in response to detecting the user, resume or begin operations in the information handling device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Embodiments of user detection apparatus and systems are described with reference to the drawings. Also described are embodiments of methods that can detect the presence of a user proximate to an information handling device.

Figure 1:
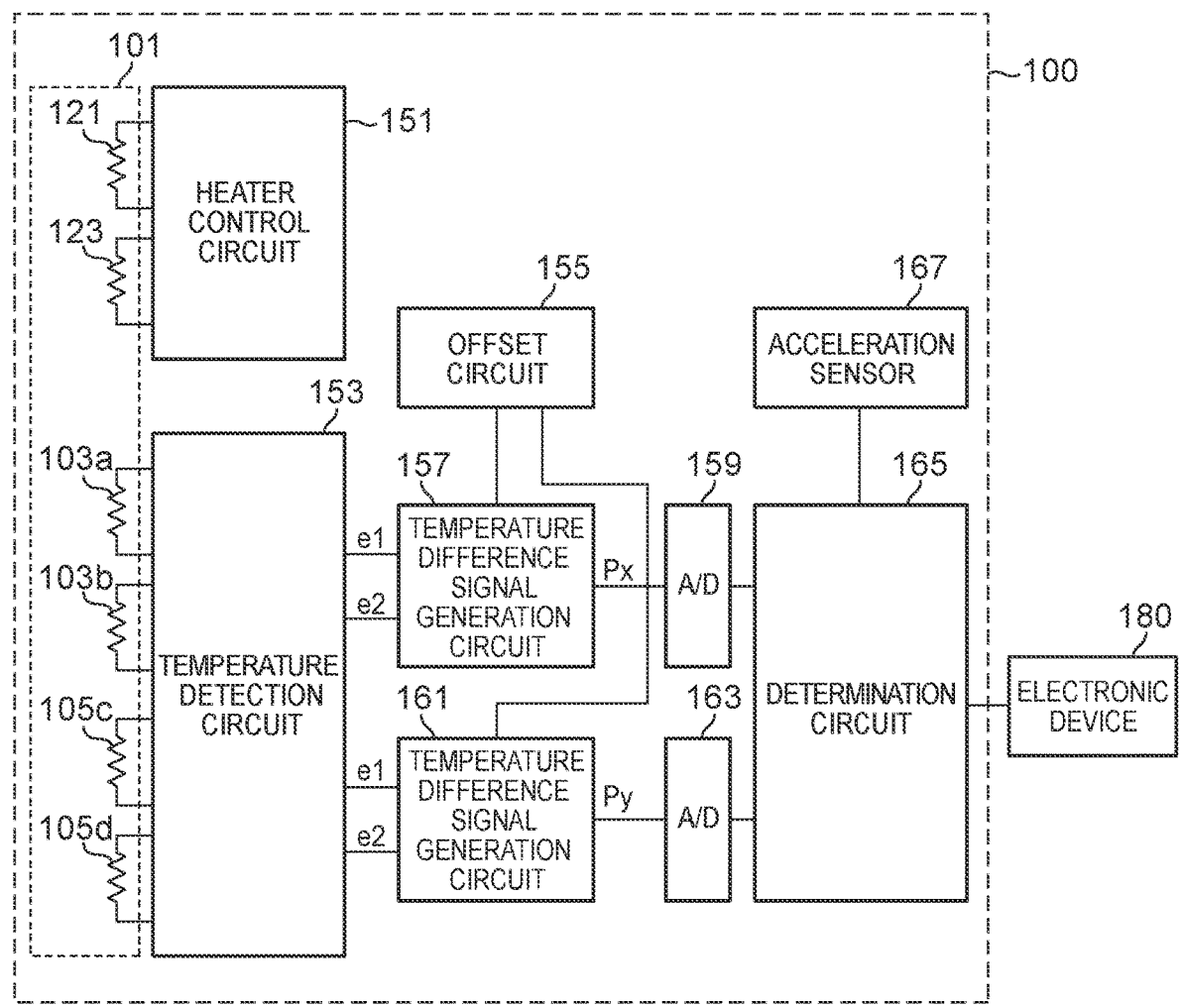
FIG. 1 is a functional block diagram schematically illustrating an embodiment of a user detection system.
Figure 2:
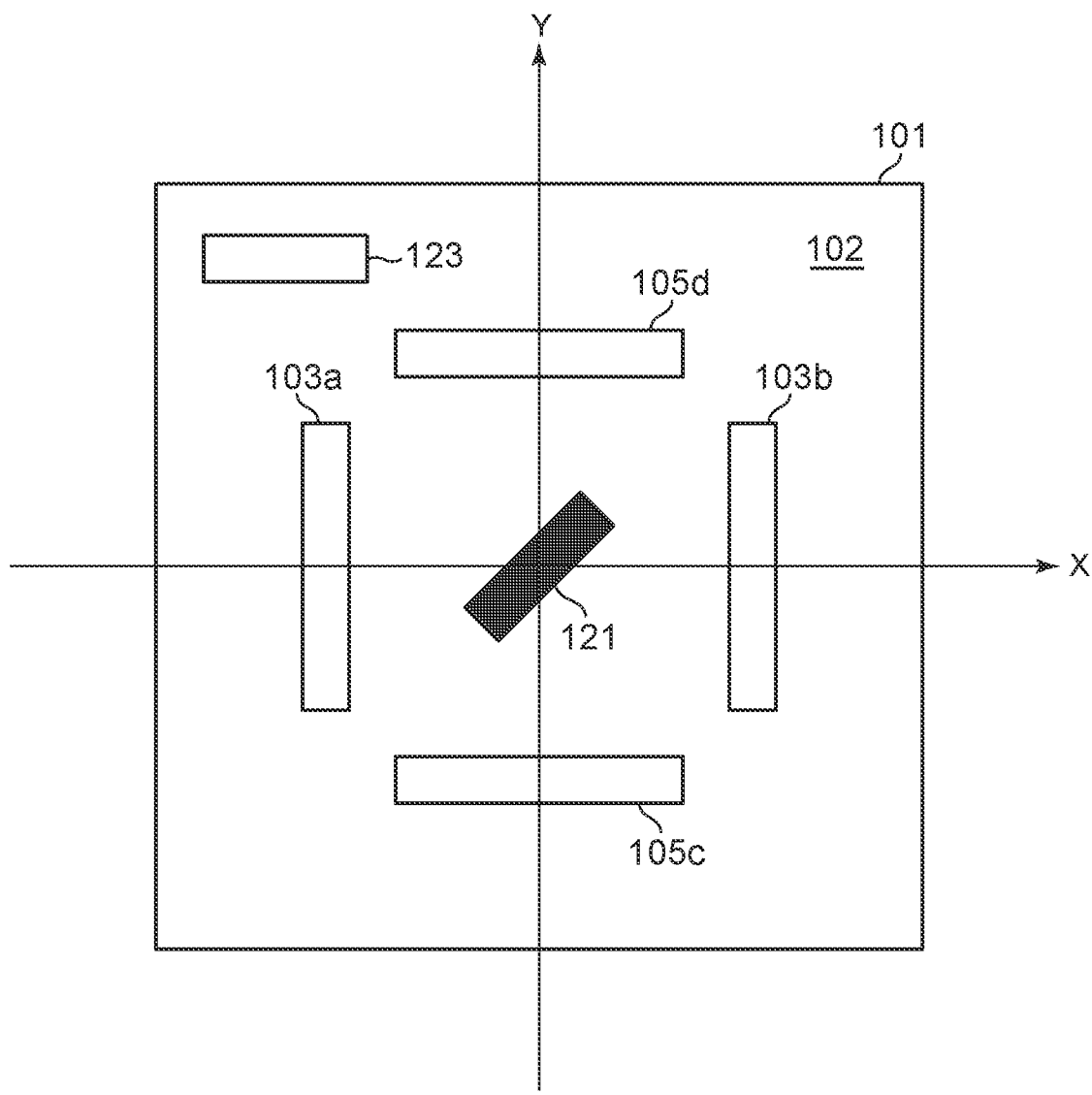
FIG. 2 is a plan view of a sensor unit including the user detection system of FIG. 1.
Figure 3A:
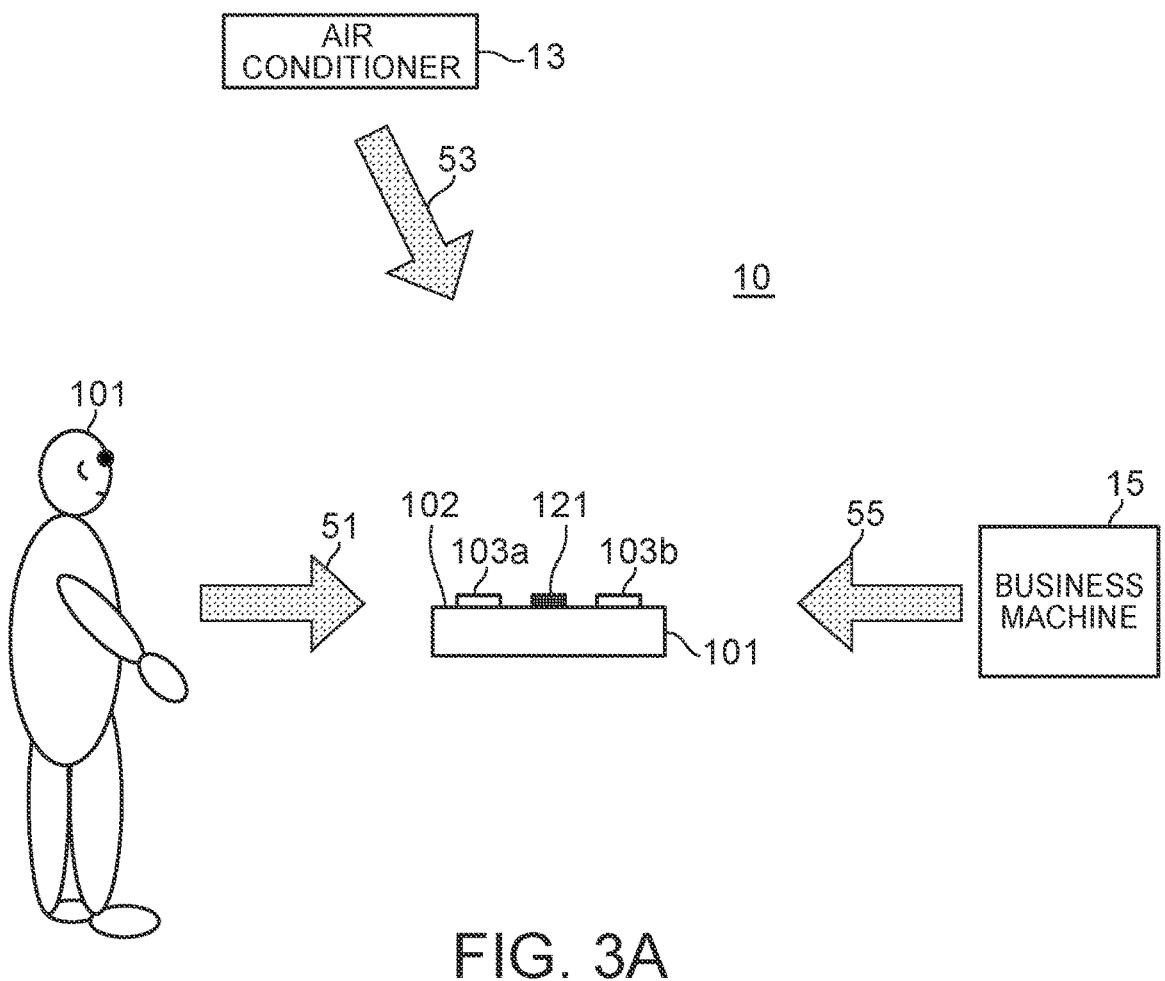
FIGS. 3A and 3B are diagrams illustrating a relationship between the sensor unit of FIG. 2 and an airflow in a user space.
Figure 3B:
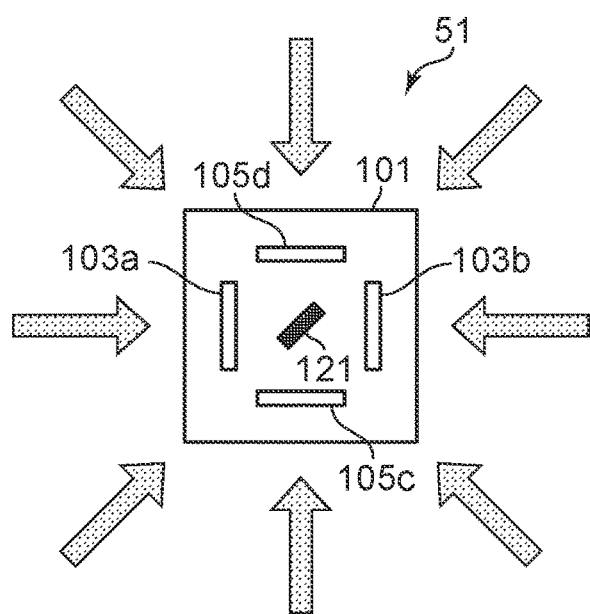
Figure 4:
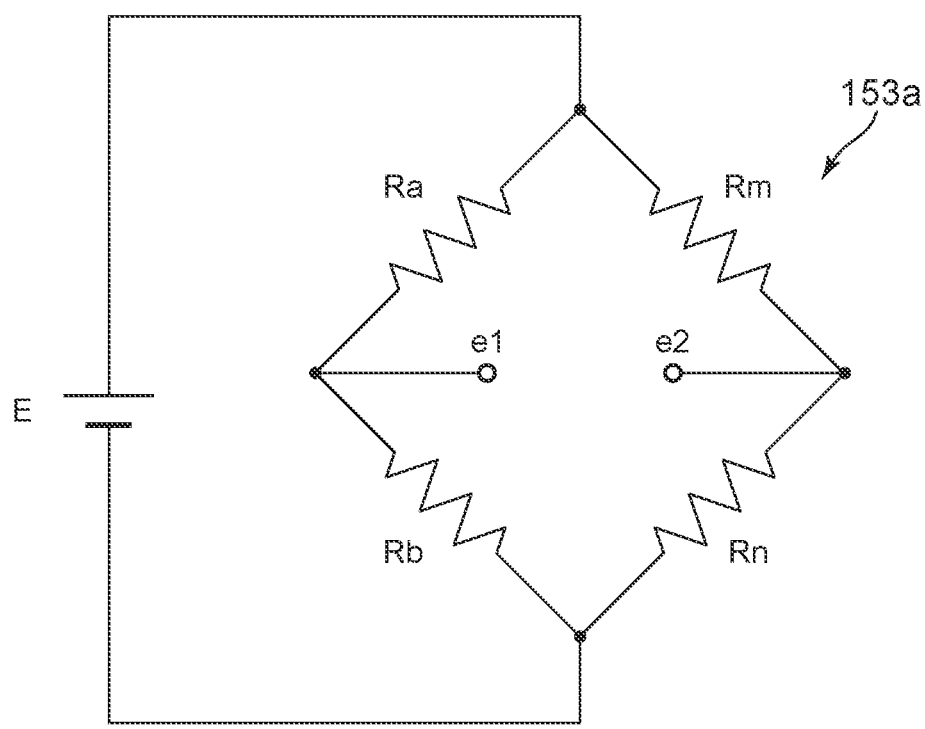
FIG. 4 is a bridge circuit illustrating an example configuration of a temperature detection circuit.

FIG. 1 is a block diagram schematically illustrating one embodiment of a user detection system 100. FIG. 2 is a plan view of a sensor unit 101 including the user detection system 100. FIGS. 3A and 3B are diagrams illustrating a relationship between the sensor unit 101 and an airflow 51 and 53, respectively, in a user space 10. FIG. 4 is a wiring diagram of a bridge circuit 153a as an example of a temperature detection circuit 153.

The user detection system 100 can detect a human 11 (see FIG. 3A) in a user space 10 and output a detection signal for controlling an electronic device 180. When a detection signal is not output, the electronic device 180 recognizes that no user/human is present.

A user space 10, as used herein, corresponds to the space in which an airflow generated by motion of a user can be propagated. Thus, the user space 10 as used in the present invention excludes closed space or semi-closed space in which propagation of an airflow generated by motion of a user is limited, even in response to a user being present in the user space 10.

The user detection system 100, in various embodiments, includes a sensor unit 101, a heater control circuit 151, a temperature detection circuit 153, an offset circuit 155, a temperature difference signal generation circuits 157 and 161, A/D converters 159 and 163, an acceleration sensor 167, and a determination circuit 165. The electronic device 180 may be disposed in the user space 10 or outside the user space 10. Among the components of the user detection system 100, at least the sensor unit 101 is disposed in the user space 10. The user detection system 100 may be incorporated in the electronic device 180 disposed in the user space 10.

As illustrated in FIG. 2, the sensor unit 101 includes a heater 121 that generates heat and is disposed on a sensor plane 102 formed on a semiconductor substrate of about 3 mm×3 mm, for example. The heater 121 locally increases the temperature of air in the user space 10. On the sensor plane 102, an X-axis and a Y-axis that are orthogonal to each other are defined. In an example, the heater 121 is disposed at the origin, a pair of temperature sensor elements 103a and 103b is disposed on the X-axis at the same distance from the origin, and a pair of temperature sensor elements 105c and 105d is disposed on the Y-axis at the same distance from the origin.

The temperature sensor elements 103a, 103b, 105c, and 105d are disposed at locations at which the temperature sensor elements 103a, 103b, 105c, and 105d can detect the temperature of air in the user space 10 increased by the heater 121 in the absence of an airflow. The temperature sensor element 123 is disposed in the user space 10 away from the heater 121 so that the temperature sensor element 123 can detect the air temperature unaffected by the temperature rise by the heater 121. The temperature detected by the temperature sensor element 123 will be hereinafter referred to as an ambient temperature. The temperature sensor elements 103a, 103b, 105c, 105d, and 123, in various embodiments, include temperature sensor resistors, although other temperature sensors such as thermocouples or thermistors are possible and contemplated herein.

In FIG. 3A, for example, the sensor unit 101 is disposed in the user space 10 in such a manner that the sensor plane 102 is horizontally oriented. If the sensor plane 102 is not horizontally oriented, the orientation can be corrected using an acceleration sensor 167 when necessary, as described elsewhere herein. When a user or human 11 moves (e.g., walks or moves his/her hands or feet in the user space 10), an airflow 51 toward the sensor unit 101 can be generated. It is assumed that the airflow 51 generated by a human 11 in normal motion flows horizontally. As illustrated in FIG. 3B, when the human 11 freely moves in the user space 10, the airflow 51 flows toward the sensor unit 101 from all the directions (e.g., 360 degrees) surrounding the sensor plane 102 and passes over the surface of the sensor plane 102.

The user detection system 100 can recognize the presence of a human 11 from a temperature difference detected by the pair of temperature sensor elements 103a and 103b and the pair of temperature sensor elements 105c and 105d, which is caused by the airflow 51 flowing along the sensor plane 102. These temperature differences can be generated from the temperature of the air heated by the heater 121 and/or the airflow 51 that changes the air temperature. The user detection system 100 can also distinguish between a human 11 that is proximate to or near the electronic device 180 (e.g., a determined control object) and a human 11 that is away from the electronic device 180.

The user space 10 may include various factors that can generate an airflow aside from a moving human 11. For example, in a case where the user space 10 is an office, the user space 10 includes an airflow 53 flowing from an air vent of an air conditioner 13 installed in a ceiling and/or an airflow 55 from a heat dissipation fan of a business machine 15. The airflow 53 flowing to the sensor plane 102 from directly above and the horizontal airflow 55 flowing along the sensor plane 102 can be considered and/or determined to be noise by the user detection system 100. The user detection system 100 can detect the presence of the human 11 while also distinguishing the between airflow 51 generated by the human 11 and the airflow(s) 53 and/or 55, which are regarded as noise.

At least in the embodiment illustrated in FIG. 1, the heater 121 and the temperature sensor element 123 are connected/coupled to the heater control circuit 151. In FIG. 1, a power supply is not shown, although it should be understood that various embodiments can include a power supply. The heater control circuit 151 can control the amount of power that is supplied to the heater 121 so that the temperature of the heater 121 is greater than the ambient temperature measured by the temperature sensor element 123, which can be greater than a predetermined value and/or difference.

The temperature detection circuit 153 can detect a resistance value measured by the temperature sensor elements 103a, 103b, 105c, and 105d. The temperature sensor elements 103a, 103b, 105c, and 105d can output the detected resistance value as a quantity of electricity and a resistance value can correspond to the temperature in the user space 10. For example, the temperature detection circuit 153 can include a bridge circuit 153a including the temperature sensor element 103a with a resistance Ra, the temperature sensor element 103b with a resistance Rb, and resistance elements of fixed resistances Rm and Rn, as illustrated in FIG. 4.

In some embodiments, the temperature detection circuit 153 can output, to the temperature difference signal generation circuits 157 and 161, voltages e1 and e2 at the connection points of the pair of temperature sensor elements 103a and 103b and the pair of temperature sensor elements 105c and 105d, respectively. In an instance in which a direct-current (DC) voltage, E, is applied to the bridge circuit 153a, a difference between the voltage e1 at the connection point between the resistances Ra and Rb and the voltage e2 at the connection point between the resistances Rm and Rn can be determined and/or calculated by Equation (1):

$$e1 - e2 = \left(\frac{-Ra}{Ra + Rb} + \frac{Rm}{Rm + Rn}\right)E = \left(\frac{Rb}{Ra + Rb} - \frac{Rn}{Rm + Rn}\right)E. \quad (1)$$

In some embodiments, the temperature sensor elements 103a and 103b include similar temperature resistance characteristics and the resistances $R_m$ and $R_n$ include similar resistance value.

Figure 5A:
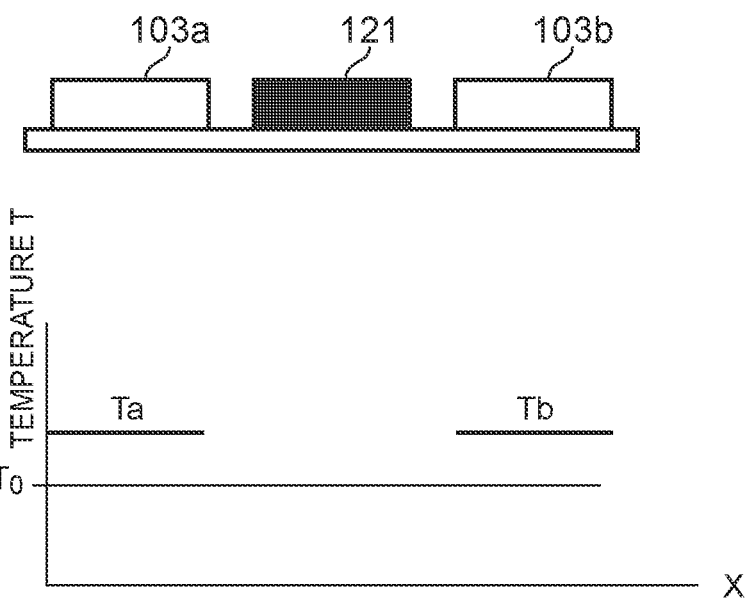
FIGS. 5A and 5B are illustrations describing various temperatures that can be detected by temperature sensor elements and that can change depending on an airflow in the user space 10.
Figure 5B:
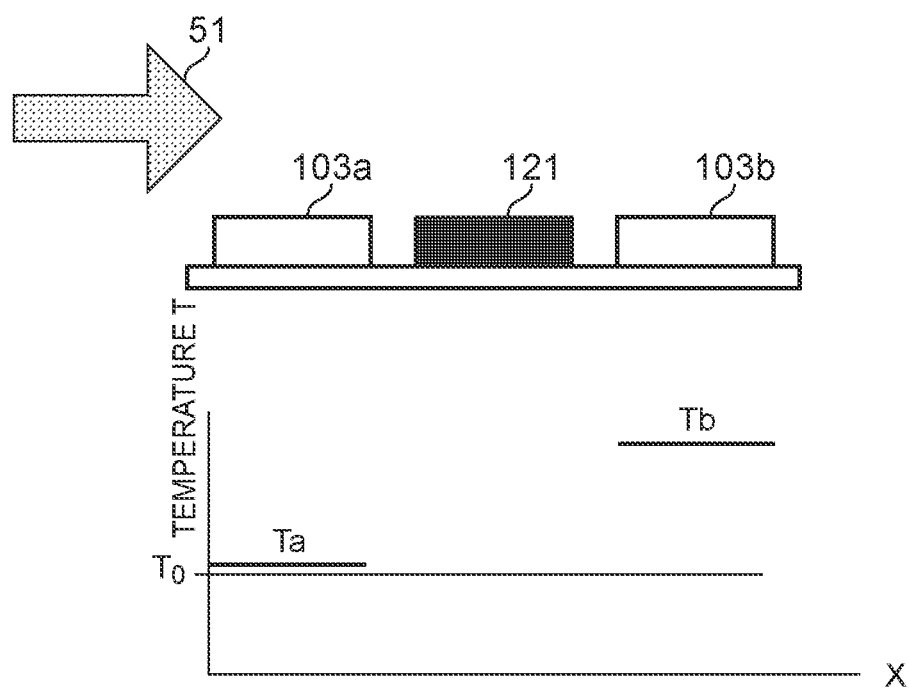

FIGS. 5A and 5B are illustrations describing temperatures that can be detected by the temperature sensor elements 103a and 103b when the heater 121 generates heat. FIG. 5A shows temperatures Ta and Tb of air detected by the temperature sensor elements 103a and 103b when the heater 121 generates heat in the user space 10 in which no airflow is present and the ambient temperature is $T_0$.

While operating, the heater 121 locally heats the air in the user space 10, and thus, the temperatures Ta and Tb are higher than the ambient temperature $T_0$ prior to the heat being generated. Since the temperature sensor elements 103a and 103b are disposed and/or oriented symmetrical with respect to the heater 121, the temperatures Ta and Tb may be equal or substantially equal. This state can be referred to as a thermal equilibrium of the sensor unit 101. Similarly, the temperature of the air detected by the temperature sensor elements 105c and 105d may be kept in thermal equilibrium.

In FIG. 5B, with the airflow 51 along the X-axis generated in the user space 10, upstream air can be replaced by air including the ambient temperature $T_0$ so that the temperature Ta that may be detected by the temperature sensor element 103a decreases below the thermal equilibrium temperature. On the other hand, downstream air may be replaced by air heated by the heater 121 so that the temperature Tb detected by the temperature sensor element 103b increases above the thermal equilibrium temperature. As such, air detected by the temperature sensor elements 105c and 105d may both be replaced by air at the ambient temperature $T_0$ and the temperature thereof can decrease by the same degree and/or amount.

Considering that the resistance values of the resistances Ra and Rb can change at the same rate even when the ambient temperature changes, the temperature difference signal generation circuits 157 and 161 can calculate the resistance values of the temperature sensor elements 103a, 103b, 105c, and 105d when the airflow 51 is generated by substituting a voltage difference e1−e2 to Equation (1). In addition, the temperature difference signal generation circuits 157 and 161 can also calculate a temperature difference measured by the pair of temperature sensor elements 103a and 103b from the changed resistance values.

In the range of a constant flow rate, as the flow rate increases, the temperature of the temperature sensor element 103a decreases toward the ambient temperature $T_0$, and the temperature of the temperature sensor element 103b increases. Thus, the temperature difference has a correlation with the flow rate of the horizontal airflow 51. The user detection system 100 estimates the flow rate of the airflow 51 from the temperature difference so that the user detection system 100 can distinguish between a moving human 11 near the sensor unit 101 and a human 11 moving at a location away from the sensor unit 101.

In addition or alternative to the bridge circuit 153a, the temperature detection circuit 153 may directly output a voltage or a current corresponding to the temperatures of the temperature sensor elements 103a, 103b, 105c, and 105d. The temperature difference signal generation circuits 157 and 161 generate temperature difference signals Px and Py corresponding to the temperature differences detected by the pair of temperature sensor elements 103a and 103b and the pair of temperature sensor elements 105c and 105d, respectively. The temperature difference signal generation circuits 157 and 161 can further output the generated temperature difference signals Px and Py to the A/D converters 159 and 163.

The offset circuit 155 corrects variations at a zero point that is generated based on changes with time of resistance values of the temperature sensor elements and the resistance elements used in the bridge circuit 153a. When the temperature of the pair of temperature sensor elements 103a and 103b is equal to the temperature of the pair of temperature sensor elements 105c and 105d, the offset circuit 155 outputs an offset amount for adjusting the zero point to the temperature difference signal generation circuits 157 and 161.

The determination circuit 165 determines whether a human 11 is present based on the digital temperature difference signals Px and Py received from the A/D converters 159 and 163. The determination circuit 165 can include semiconductor chips, a processor (e.g., a CPU) and/or system memory, an information handling device (e.g., cellular/smart telephone, computing tablet, laptop computer, desktop computer, smart watch, personal digital assistant (PDA), etc.), and/or computer-useable or computer-readable code (e.g., firmware and/or software (e.g., a device driver)). The determination circuit 165 can output a detection signal to an input circuit of various types of electronic devices 180 that operate depending on whether a human 11 is present. The determination circuit 165, in some embodiments, may be incorporated in the electronic device 180.

An acceleration sensor 167 detects a tilt of the sensor plane 102. The determination circuit 165 uses the acceleration sensor 167 when necessary. In response to the sensor plane 102 being tilted, the determination circuit 165 corrects the temperature difference signals Px and Py to the temperature difference signals Px and Py that may be obtained when the sensor plane 102 is horizontally oriented.

Figure 6A:
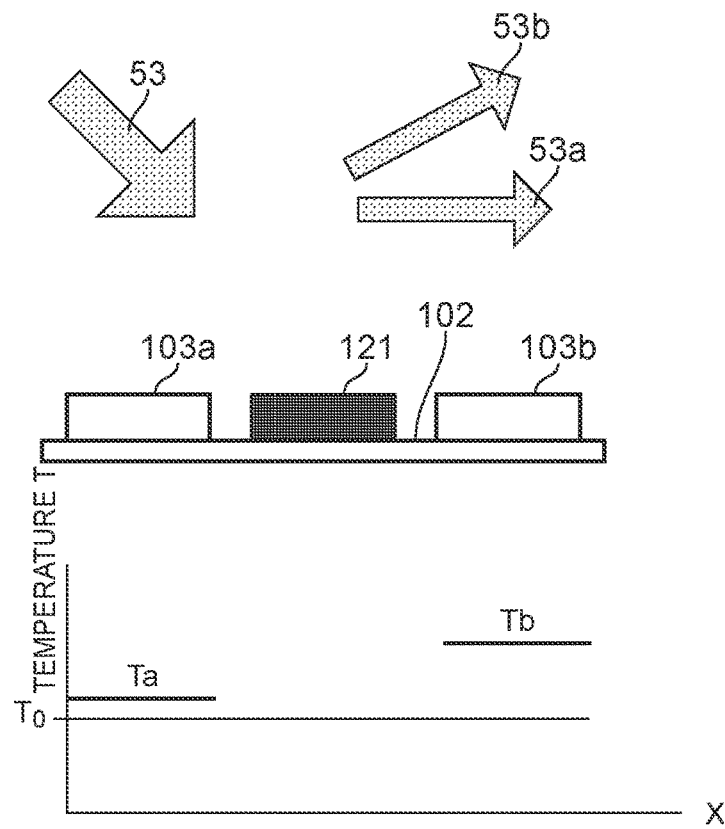
FIGS. 6A and 6B are illustrations describing temperatures that can be detected by temperature sensor elements and that can change depending on an airflow in the user space 10.

As illustrated in FIG. 6A, the airflow 53 flowing to the horizontal sensor plane 102 from directly above collides with the sensor plane 102 and is divided into a horizontal component 53a along the sensor plane 102 and a reflection component 53b. The horizontal component 53a causes a temperature difference between an upstream side of the heater 121 and a downstream side of the heater 121, but the reflection component 53b does not effectively act on formation of a temperature difference. As the direction of the airflow 53 relative to the sensor plane 102 approaches a vertical direction, the reflection component 53b increases.

When the airflow 53 flows vertically downward, the airflow 53 affects temperatures measured by the temperature sensor elements 103a, 103b, 105c, and 105d to substantially the same degree. It can be difficult to distinguish the horizontal airflow 51 generated by the human 11 from the horizontal component 53a of the airflow 53 generated by the air conditioner 13 based on the temperature difference detected by the two-dimensional sensor unit 101. Similarly, it can also be difficult to distinguish the horizontal airflow 51 from the horizontal airflow 55 generated by the business machine 15.

The embodiment illustrated in FIG. 6A provides a method for eliminating the influence of the airflows 53 and 55 by devising an installation technique of the sensor unit 101. As a precondition, the airflow 51 flows toward the sensor unit 101 from any direction from the surroundings, as illustrated in FIG. 3B. On the other hand, each of the airflows 53 and 55 flowing from sources located at fixed positions can be defined in a relative direction with respect to the position of the sensor unit 101. By utilizing these characteristics, the airflow 51 can be distinguished from the airflows 53 and 55.

Figure 6B:
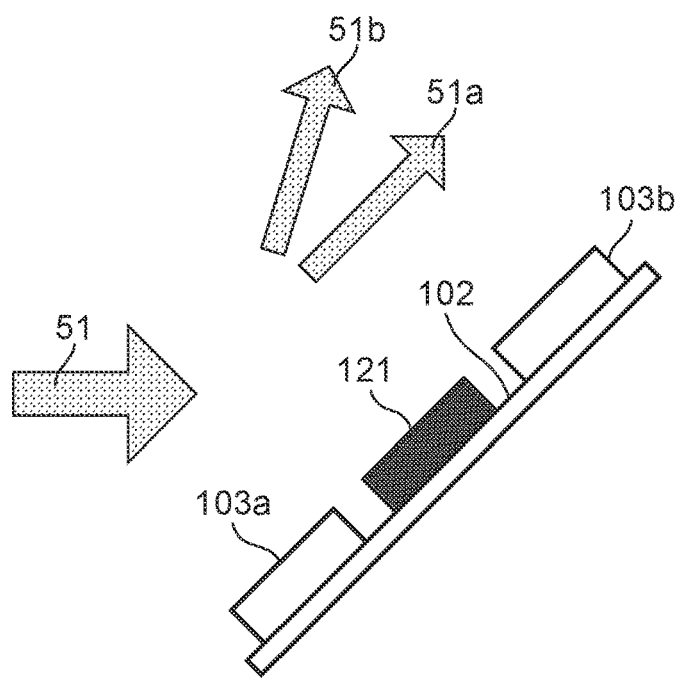

As illustrated in FIG. 6B, the sensor plane 102 can be tilted away from the horizontal orientation in some installation methods. In such cases, even at the same flow rate of the airflow 51, the quantity of an airflow 51a flowing along the sensor plane 102 is smaller than that of the airflow 51, and the detected temperature difference is smaller than the case in which the sensor plane 102 is horizontal. The rate of decrease of the temperature difference caused by tilting the sensor plane 102 depends on the flow rate of the airflow 51, the tilt angle of the sensor plane 102, the shape of the sensor plane 102, and so forth. Using various parameters, the degree of correction for converting the temperature difference obtained when the sensor plane 102 is tilted to a temperature difference obtained when the sensor plane 102 is horizontal can be obtained.

Figure 7:
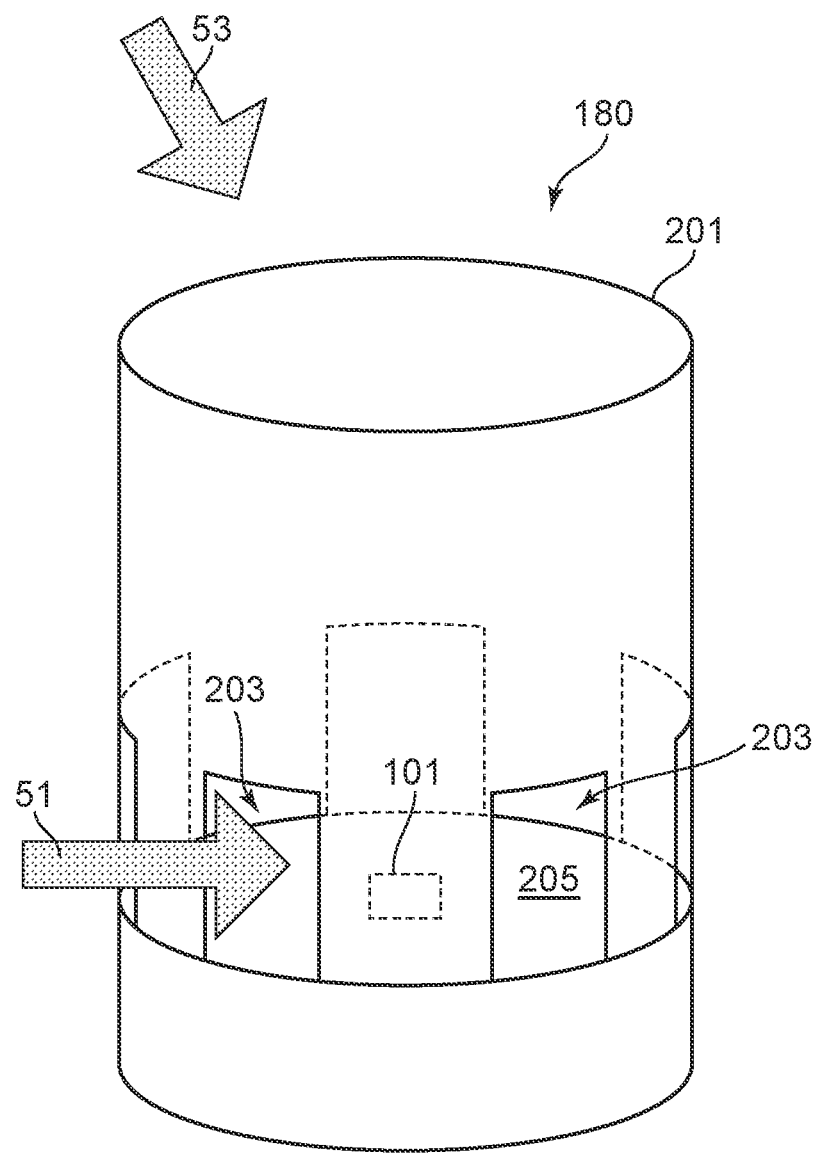
FIG. 7 is a perspective view illustrating one example of an electronic device including the user detection system of FIG. 1.

FIG. 7 is a perspective view illustrating an example appearance of an electronic device 180 including the user detection system 100. At least in the illustrated embodiment, the electronic device 180 has a plurality of openings 203 in the side surface of the cylindrical chassis 201 and the sensor unit 101 is disposed on a horizontal attachment surface 205. The electronic device 180 may be a network device that operates in response to receiving a detection signal from the user detection system 100.

The chassis 201 blocks the airflow 53 flowing toward the sensor unit 101 from above and can allow the horizontal airflow 51 to pass through it. The positions of the openings 203 of the chassis 201 may be adjusted so that a flow of the horizontal airflow 55 generated by the business machine 15 is blocked. In this case, the airflow 51 generated by the human 11 may be detected as a narrow range.

Figure 8:
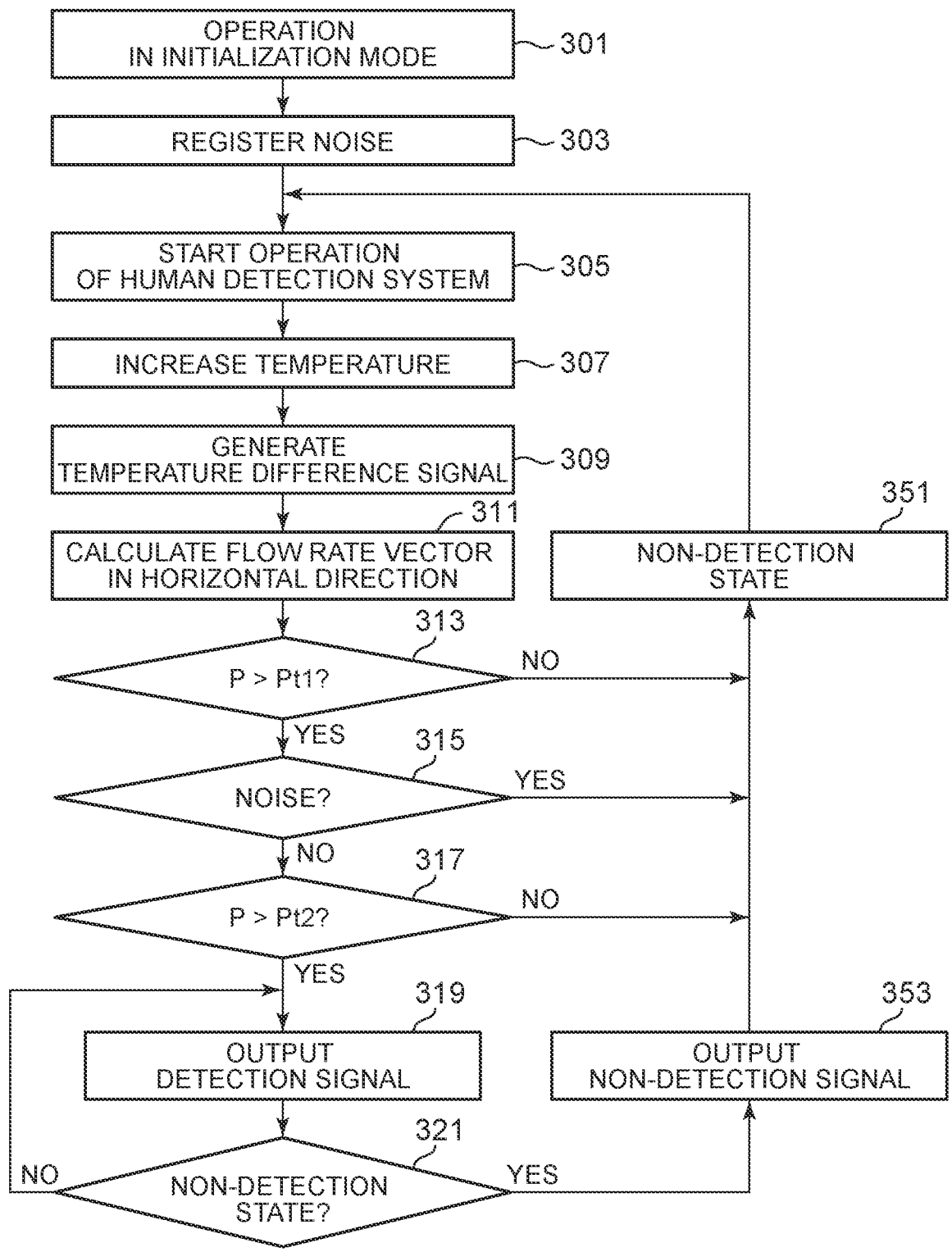
FIG. 8 is a flowchart depicting an example operation procedure of the user detection system of FIG. 1.

FIG. 8 is a flowchart depicting an operation procedure of the user detection system 100. In block 301, the sensor unit 101 is disposed in the user space 10 and then, the determination circuit 165 operates in an initialization mode for registering the airflows 53 and 55 regarded as noise. In the initialization mode, the user detection system 100 operates in the user space 10 where a human 11 may be absent and the airflow 53 and/or airflow 55 is/are sequentially generated.

Figure 9:
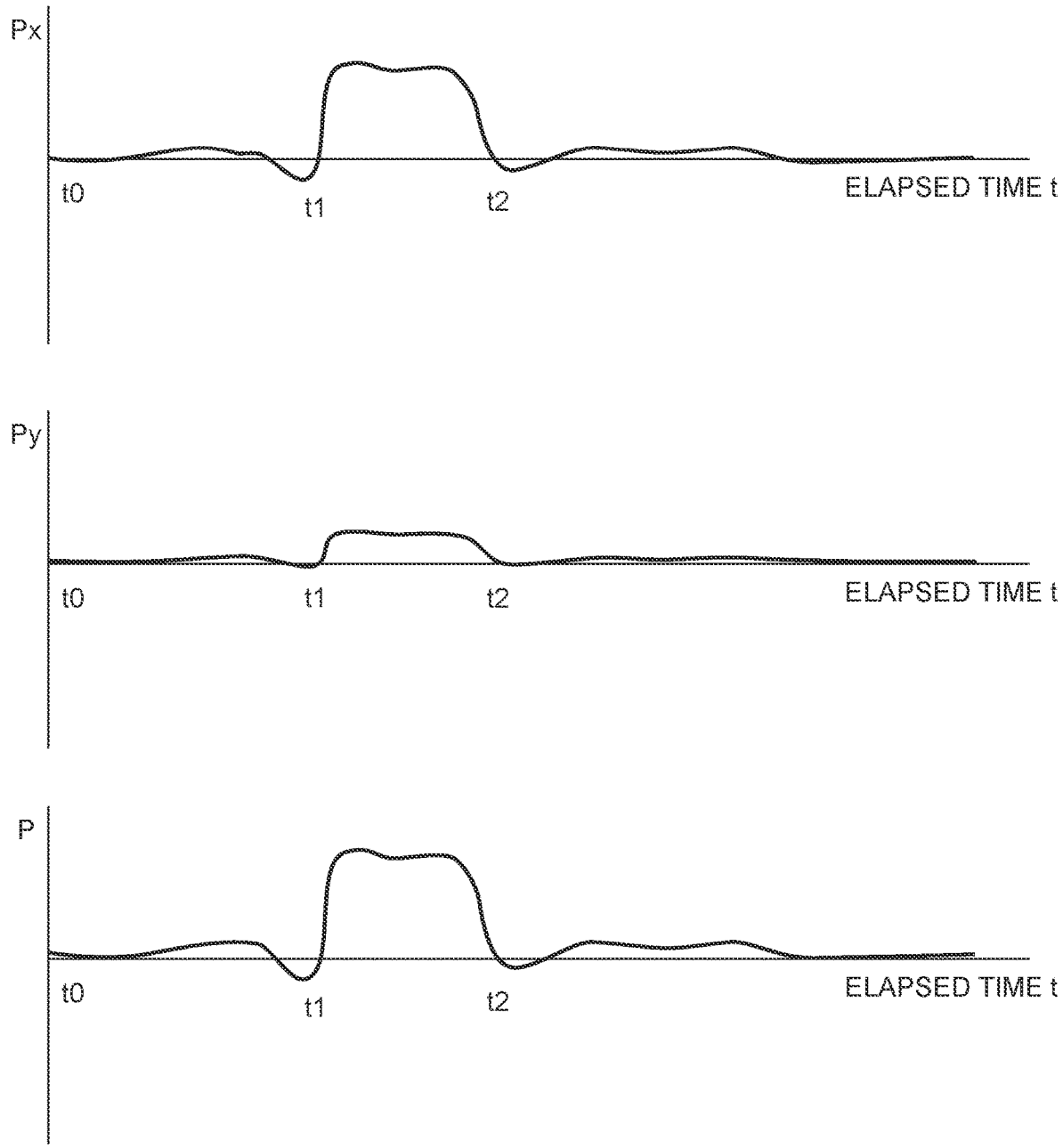
FIG. 9 shows graphs describing relationships among various temperature difference signals Px and Py and a flow rate vector P.

With the position of the sensor unit 101 remaining fixed, FIG. 9 shows graphs describing various relationships between the temperature difference signals Px and Py and the flow rate vector P. The temperature difference signal generation circuits 157 and 161 can begin outputting the temperature difference signals Px and Py at time t0. The temperature difference signals Px and Py reduce the influence over time of an airflow generated in a short time as travel average values or travel integrated values.

At times t0 to t1, since no airflow is generated, the sensor unit 101 is kept in the thermal equilibrium, and the temperature difference signals Px and Py are approximately zero. At time t1, when the airflow 53 is generated, the temperature difference signals Px and Py increase in accordance with the direction and flow rate of the airflow 53. The determination circuit 165 synthesizes vectors of the temperature difference signals Px and Py and calculates a two-dimensional flow rate vector P. In the case where the sensor plane 102 is tilted, the determination circuit 165 can correct the temperature difference signals Px and Py to values obtained had the sensor plane 102 been horizontal by using the tilt angle indicated by the acceleration sensor 167 and the degrees of correction selected from the levels of the temperature difference signals Px and Py. When the airflow 53 stops at time t2, the temperature difference signals Px and Py return to zero and are kept at zero from time t2.

The direction of the flow rate vector P indicates the direction of the airflow 53 flowing from the surroundings to the sensor unit 101 kept in the horizontal orientation or the sensor unit 101 corrected to the horizontal orientation. In block 303, the determination circuit 165 registers flow rate vectors P corresponding to the airflows 53 and 55 as noise. In the case of eliminating the influences of the airflows 53 and 55 by using the chassis 201 of the electronic device 180 as a windbreak cover, the processes in blocks 301 and 303 may be omitted.

In block 305, the user detection system 100 starts operating. In block 307, the heater 121 starts increasing the temperature. In block 309, the temperature difference signal generation circuits 157 and 161 start outputting temperature difference signals Px and Py calculated as travel average values or travel integrated values. In block 311, the determination circuit 165 calculates the two-dimensional flow rate vector P as described with reference to FIG. 9.

The flow rate vector P corresponds to the horizontal airflow 51 or the horizontal airflow component 53a. In the case where the sensor unit 101 is tilted, the determination circuit 165 can correct the temperature differences to those obtained when the sensor plane 102 is horizontal, by using a tilt angle measured by the acceleration sensor 167.

Figure 10A:
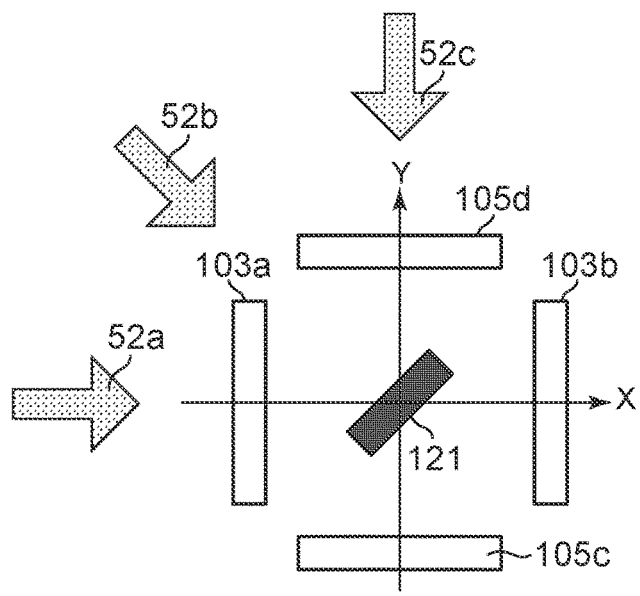
FIGS. 10A through 10D are illustrations describing various embodiments of a method for calculating a two-dimensional flow rate vector P from the temperature difference signals Px and Py.
Figure 10B:
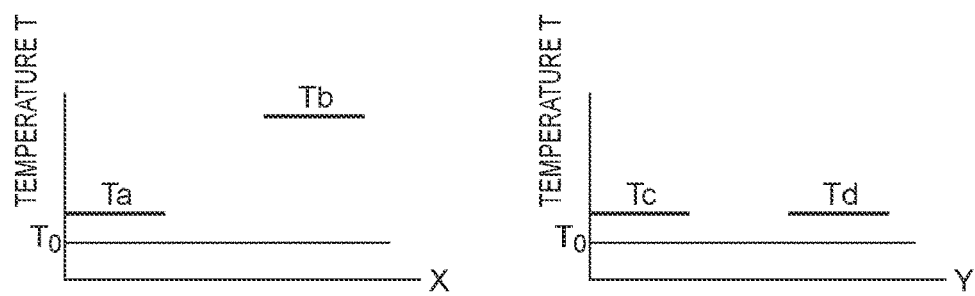
Figure 10C:
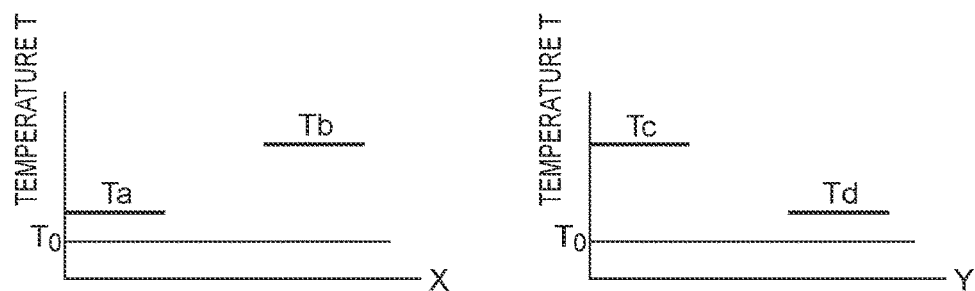
Figure 10D:
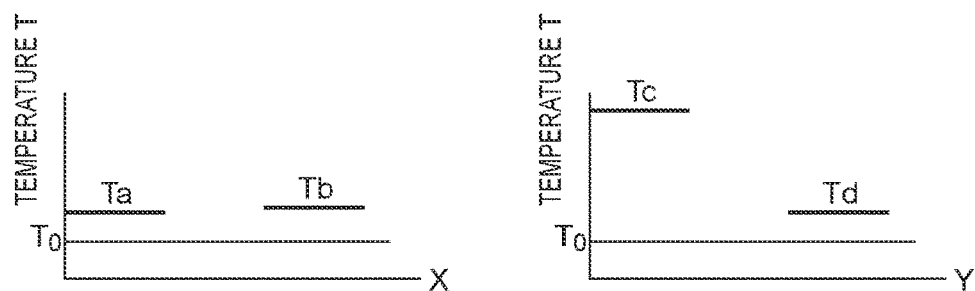
Figure 11A:
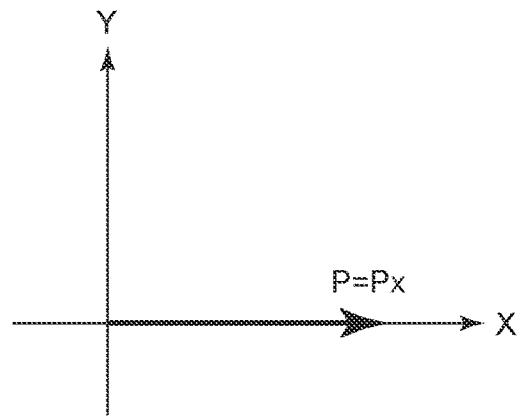
FIGS. 11A through 11C shows graphs describing various embodiments of another method for calculating the two-dimensional flow rate vector P from the temperature difference signals Px and Py.
Figure 11B:
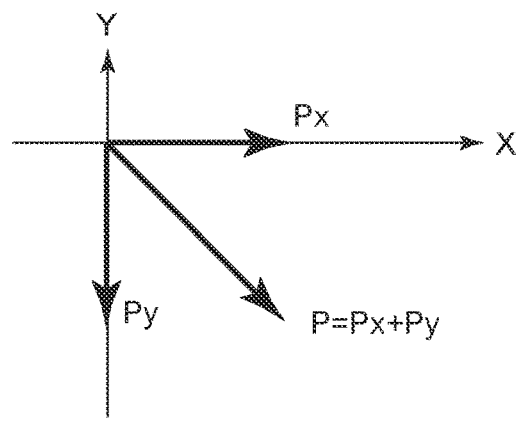
Figure 11C:
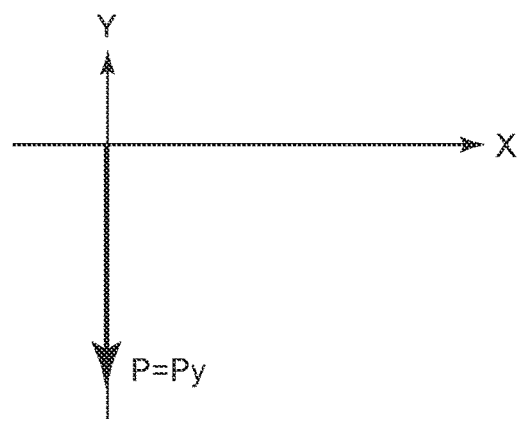

FIGS. 10A through 10D are illustrations describing various embodiments of a method for calculating a two-dimensional flow rate vector P. FIG. 10A illustrates a state in which airflows 52a through 52c horizontally flowing relative to the sensor unit 101 flow along an X-axis direction, a 45-degree direction, and a Y-axis direction, respectively. The temperatures Ta, Tb, Tc, and Td detected by the temperature sensor elements 103a, 103b, 105c, and 105d are shown in FIGS. 10B, 10C, and 10D with respect to the airflows 52a, 52b, and 52c, respectively. Flow rate vectors P of the airflows 52a, 52b, and 52c at this time are shown in FIGS. 11A, 11B, and 11C, respectively.

In block 313, in response to the absolute value of the flow rate vector P being a predetermined value Pt1 or more, the determination circuit 165 determines that a significant airflow including the possibility of noise is generated, and the process proceeds to block 315. As long as the absolute value of the flow rate vector P is below the predetermined value Pt1, the process returns to block 351 and the user detection system 100 maintains a non-detection state.

In response to a situation in which the sensor unit 101 might be affected by the airflows 53 and 55, in block 315, the determination circuit 165 determines whether the flow rate vector P is generated by the airflow 53 or 55. In response to the flow rate vector P coinciding with the direction and size or the direction registered in block 303, the determination circuit 165 regards the corresponding flow rate as noise, and the process can proceed to block 351.

Here, when the human 11 generates an airflow in the same direction as a horizontal airflow or a horizontal airflow component regarded as noise, the user detection system 100 cannot detect the human 11. On the other hand, when the human 11 moves to various locations and exercises in the user space 10, a flow rate vector P of the airflow 51 in a direction different from the direction of noise is generated accordingly.

In response to a human 11 moving at a location away from the sensor unit 101 that is not detected and a nearby human 11 is detected, the process proceeds to block 317. In block 317, in response to the flow rate vector P exceeding a predetermined value Pt2, the determination circuit 165 recognizes the presence of a user using the electronic device 180 and, in block 319, outputs a detection signal to an input circuit of the electronic device 180.

In response to the detection signal, the electronic device 180 can resume operations from a standby state, cause an electronic device connected to the network to operate, or call the user by sound. In block 321, in response to the user detection system 100 not detecting a human 11 within a predetermine or threshold amount of time, the process proceeds to block 353 and the user detection system 100 outputs a non-detection signal to the electronic device 180.

Figure 12:
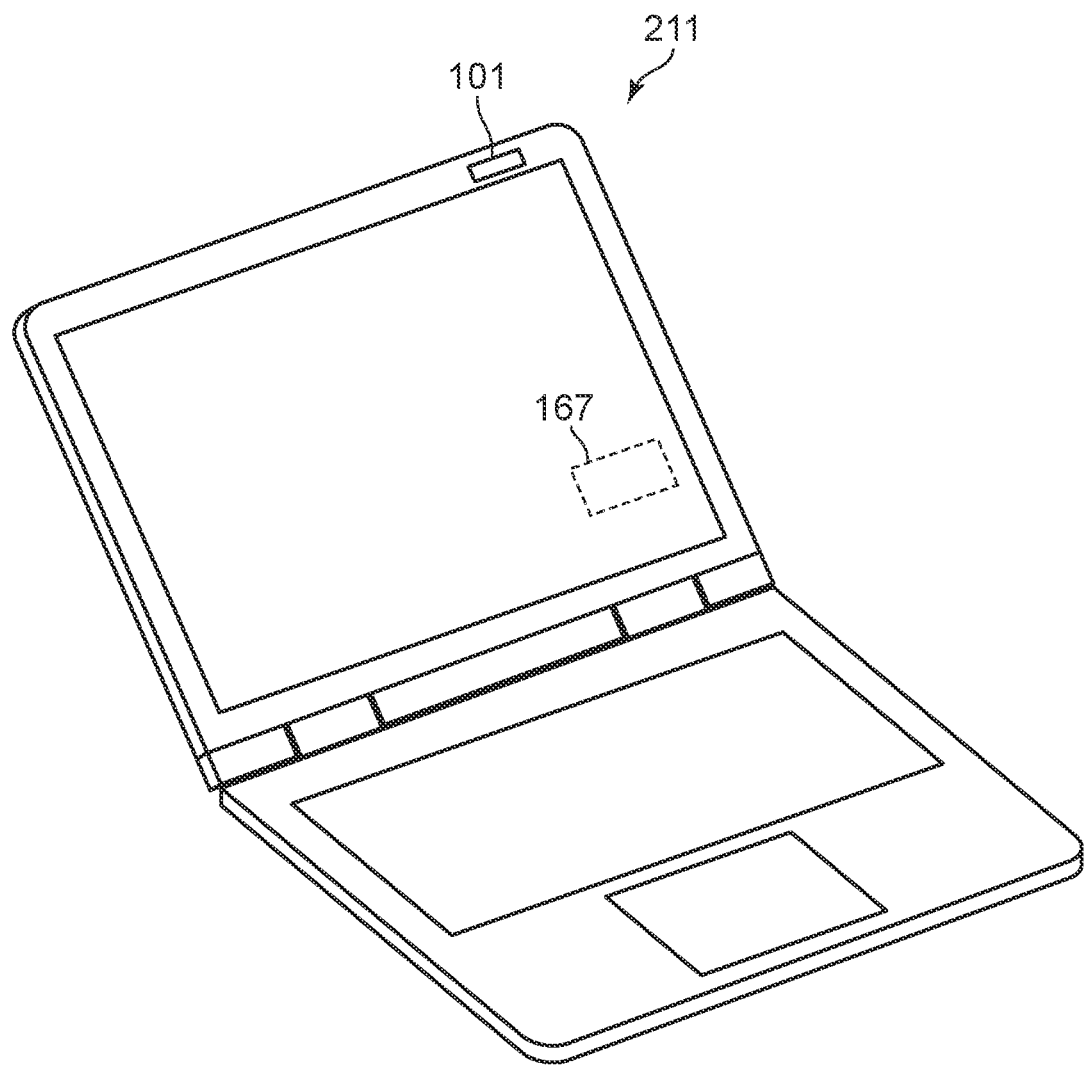
FIG. 12 is a perspective view illustrating a sensor unit included in a laptop computing device.

As illustrated in FIG. 12, the sensor unit 101 may be provided in a chassis of, for example, a laptop computing device 211, among other types of portable computing devices that are possible and contemplated herein (e.g., a cellular telephone, a computing tablet, etc.). In the laptop computing device 211, since a user can change the opening angle and position of the chassis provided with the sensor unit 101 during the use, the orientation and direction of the sensor plane 102 may not be fixed. In addition, it may be difficult to block an airflow regarded as noise with a cover of the chassis 201, as described with reference to FIG. 7. Thus, a technique for distinguishing a significant temperature difference signal from noise is provided and described with reference to FIG. 13.

Figure 13:
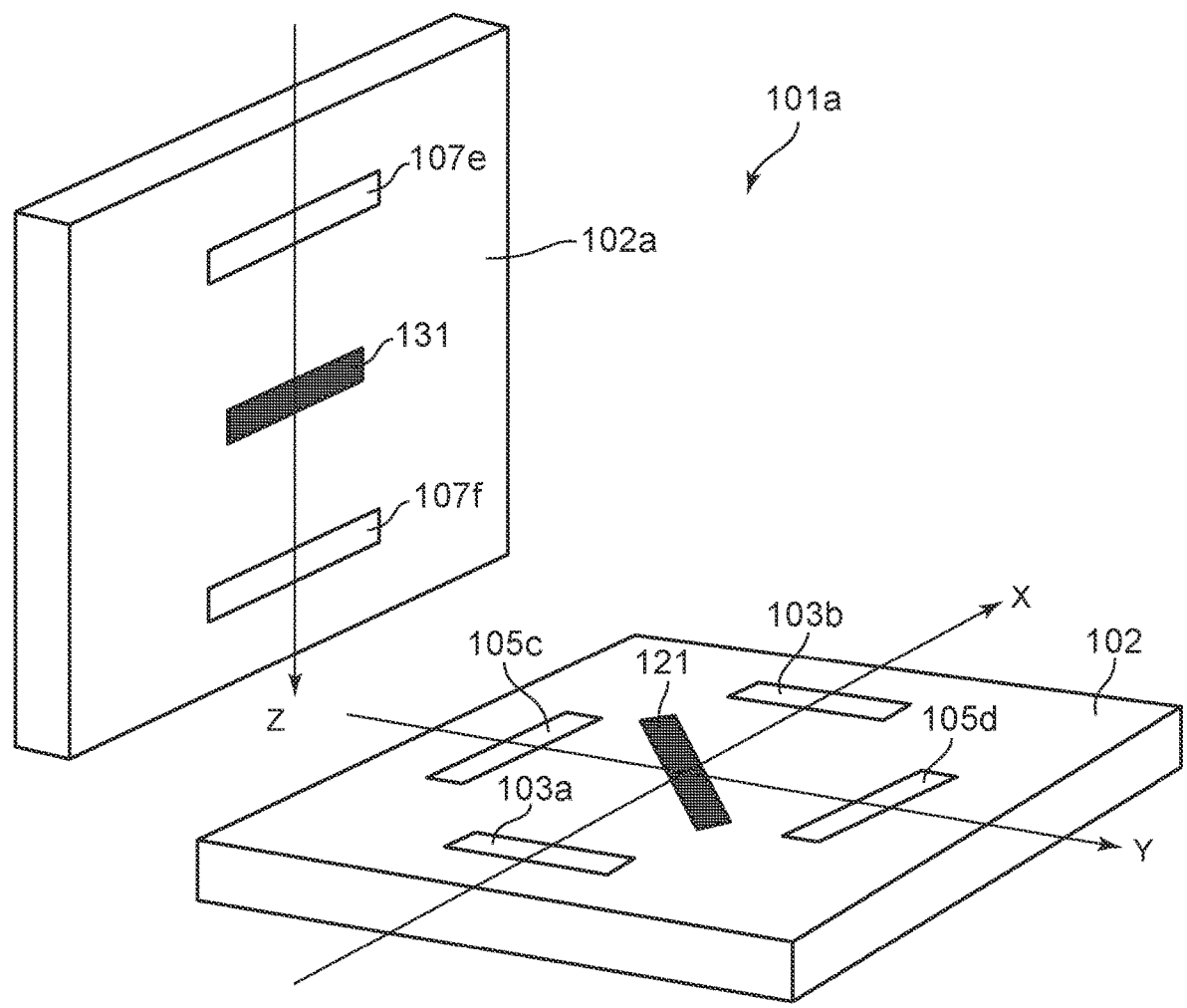
FIG. 13 is a perspective view schematically illustrating a sensor unit for detecting an airflow in three dimensions.

FIG. 13 is a perspective view schematically illustrating a sensor unit 101*a* for detecting an airflow in three dimensions. The sensor unit 101*a* includes a sensor plane 102 and a sensor plane 102*a* oriented at a predetermined angle relative to a plane on which the sensor plane 102 is disposed. On the sensor plane 102*a*, a pair of temperature sensor elements 107*e* and 107*f* is disposed along a Z-axis defined in a predetermined direction and sandwiches a heater 131 at a middle there between. In an example, the sensor plane 102*a* and the Z-axis can be defined perpendicularly to the sensor plane 102.

The temperature sensor elements 107*e* and 107*f* are connected to the temperature detection circuit 153, in a manner similar to other temperature sensor elements 103*a*, 103*b*, 105*c*, and 105*d* (e.g., see FIG. 1). The temperature detection circuit 153 outputs voltages e1 and e2 corresponding to the temperature sensor elements 107*e* and 107*f* to a new temperature difference signal generation circuit. The temperature difference signal generation circuit outputs, to the determination circuit 165, a temperature difference signal Pz corresponding to a temperature difference detected by the pair of temperature sensor elements 107*e* and 107*f*.

Figure 14:
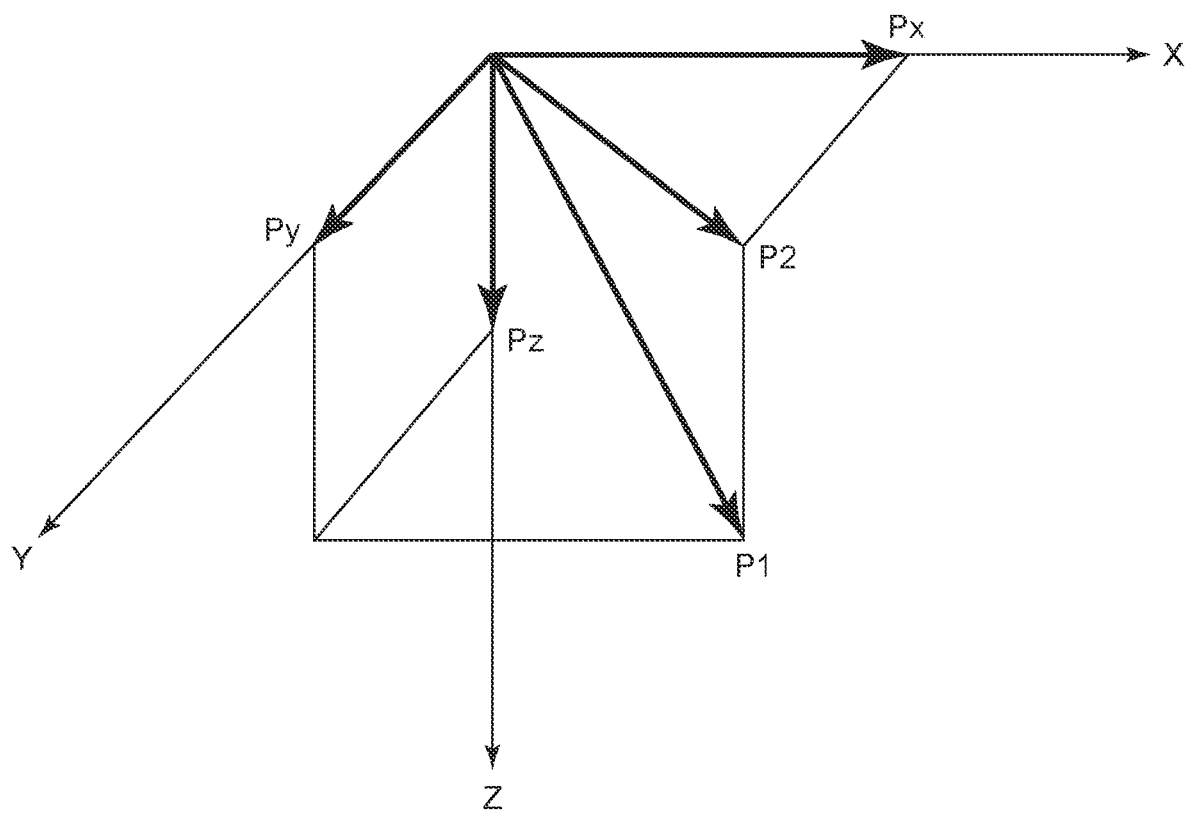
FIG. 14 is a view illustrating a method for calculating a three-dimensional flow rate vector P1.

In a case in which the sensor plane 102 is horizontally oriented, the determination circuit 165 synthesizes vectors of the temperature difference signals Px, Py, and Pz in three axes (e.g., see FIG. 14) and calculates a two-dimensional flow rate vector P2 and a three-dimensional flow rate vector P1. In a case in which the sensor plane 102 may be tilted, the determination circuit 165 determines the orientation of the sensor plane 102 from a signal of the acceleration sensor 167 and can correct the flow rate vectors P1 and P2 to values obtained in the case in which the sensor plane 102 is horizontally oriented.

The determination circuit 165 can regard, as noise, the predetermined flow rate vector P1 determined based on the direction and size or only the direction of the three-dimensional flow rate vector P1. The determination circuit 165 can regard, as noise, a flow rate vector whose vertical component Pz is a predetermined value or more. The determination circuit 165 can determine the detection signal as being noise based on the direction and size or only the direction of the two-dimensional flow rate vector P2.

In a configuration in which a plurality of sensor planes 102*a* are provided, a range where a vertical component can be detected can be enlarged. The sensor planes 102*a* and the sensor plane 102 may be disposed at different locations in the lap top 211 so that the sensor planes 102*a* and the sensor plane 102 can easily detect a horizontal airflow and a vertical airflow, respectively.

Various embodiments of the user detection system 100 may consume smaller amounts of power than an active-type user detection sensor and/or may include a comparatively simple configuration, and thus, is convenient for incorporation into an electronic device. In addition, a human 11 approaching the sensor unit 101 from any direction can be detected, and thus, the user detection system 100 can be used in wide range of areas/spaces.

The foregoing description has been directed to the specific embodiment illustrated in the drawings. The present invention, however, is not limited to the illustrated embodiment, and may, of course, employ any known configuration as long as advantages of the various embodiments can be obtained.

What is claimed is:

1. An apparatus, comprising:
a processor of an information handling device; and
a memory that stores code executable by the processor to:
  detect movement of air molecules in a user space that is proximate to the information handling device,
  determine whether one of a user and an airflow device caused the movement of air molecules within the user space based on one or more characteristics of the movement of air molecules that correspond with a human or an airflow device,
  in response to determining that the user caused the movement of air molecules within the user space, one of:
    resume operations in the information handling device, and
    begin operations in the information handling device, and
  in response to determining that the airflow device caused the movement of air molecules within the user space, maintain the information handling device in a standby state.

2. The apparatus of claim 1, wherein the code is further executable by the processor to:
determine a presence of the user in the user space in response to detecting a first temperature in a first direction within the user space being lower than a second temperature detected in a second direction within the user space at a same time, the first temperature being lower as a result of the user causing the movement of air molecules by moving within the user space.

3. The apparatus of claim 1, further comprising:
a plurality of temperature sensor elements coupled to the processor,
wherein the movement of air molecules is detected in response to a temperature difference detected by a first temperature sensor element and a second temperature sensor element.

4. The apparatus of claim 3, further comprising:
a heat generation element that heats air in the user space, wherein:
  the heat generation element, the first temperature sensor element, and the second temperature sensor element are disposed on a sensor plane in the user space, and
  the temperature difference includes a difference in temperature in a first direction and a second direction along the sensor plane.

5. The apparatus of claim 4, wherein:
the sensor plane is a two-dimensional plane;
the first temperature sensor element is disposed along a horizontal axis in a first direction; and the second temperature sensor element is disposed along one of a second direction along the horizontal axis and a third direction along a vertical axis.

6. The apparatus of claim 4, further comprising:
a third temperature sensor element disposed on the sensor plane,
wherein:
the sensor plane is a three-dimensional plane,
the first temperature sensor element is disposed along a horizontal axis in a direction,
the second temperature sensor element is disposed along a different direction along the horizontal axis, and
the third temperature sensor element is disposed along a vertical axis.

7. The apparatus of claim 6, wherein the code is further executable by the processor to:
determine that a different movement of air molecules detected in a predetermined direction within the user space is noise; and
in response to detecting the noise, determine that the airflow device caused the different movement of air molecules.

8. The apparatus of claim 6, wherein the code is further executable by the processor to:
determine that a different movement of air molecules detected in a vertical direction within the user space is noise; and
in response to detecting the noise, determine that the airflow device caused the different movement of air molecules.

9. The apparatus of claim 5, wherein the code is further executable by the processor to:
determine that a different movement of air molecules detected in a predetermined direction within the user space is noise; and
in response to detecting the noise, determine that the airflow device caused the different movement of air molecules.

10. The apparatus of claim 3, wherein the code is further executable by the processor to:
detect a tilt of the plurality of sensors along a sensor plane; and
in response to detecting the tilt:
measure an amount of the tilt, and
correct a first flow rate vector based on the tilted sensor plane to a second flow rate vector,
wherein:
the movement of air molecules is based on the second flow rate vector, and
the second flow rate vector is based on the sensor plane being horizontal.

11. The apparatus of claim 1, further comprising:
a plurality of temperature sensor elements coupled to the processor,
wherein the code is further executable by the processor to detect the movement of air molecules in response to a temperature difference detected by a first plurality of temperature sensor elements and a second plurality of temperature sensor elements.

12. The apparatus of claim 10, wherein the code is further executable by the processor to:
calculate a flow rate vector from the temperature difference detected by the first plurality of temperature sensor elements and the second plurality of temperature sensor elements.

13. A method, comprising:
detecting, by use of a processor, movement of air molecules within a user space that is proximate to an information handling device;
determining whether one of a user and an airflow device caused the movement of air molecules within the user space based on one or more characteristics of the movement of air molecules that correspond with a human or an airflow device;
in response to determining that the user caused the movement of air molecules within the user space, one of:
resuming operations in the information handling device, and
beginning operations in the information handling device; and
in response to determining that the airflow device caused the movement of air molecules within the user space, maintaining the information handling device in a standby state.

14. The method of claim 13, further comprising:
determining a presence of the user in response to detecting a first temperature in a first direction within the user space being lower than a second temperature detected in a second direction within the user space at a same time, the first temperature being lower as a result of the user causing the movement of air molecules by moving within the user space.

15. The method of claim 13, further comprising:
detecting the movement of air molecules in response to a temperature difference detected by a plurality of temperature sensor elements.

16. The method of claim 15, further comprising:
calculating a flow rate vector from the temperature difference detected by a first temperature sensor element and a second temperature sensor element; and
in response to the flow rate vector being from a predetermined direction, determining that the movement of air molecules is noise and the user is not present within the user space.

17. A program product comprising a computer-readable storage medium that stores code executable by a processor, the executable code comprising code to perform:
detecting, by use of a processor, movement of air molecules within a user space that is proximate to an information handling device;
determining whether one of a user and an airflow device caused the movement of air molecules within the user space based on one or more characteristics of the movement of air molecules that correspond with a human or an airflow device;
in response to determining that the user caused the movement of air molecules within the user space, one of:
resuming operations in the information handling device, and
beginning operations in the information handling device; and
in response to determining that the airflow device caused the movement of air molecules within the user space, maintaining the information handling device in a standby state.

18. The program product of claim 17, wherein the executable code further comprises code to perform:
determining a presence of the user within the user space in response to detecting a first temperature in a first direction within the user space being lower than a second temperature detected in a second direction within the user space at a same time, the first temperature being lower as a result of the user causing the movement of air molecules by moving within the user space.

19. The program product of claim 17, wherein the executable code further comprises code to perform:
   detecting the movement of air molecules in response to a temperature difference detected by a plurality of temperature sensor elements.

20. The program product of claim 19, wherein the executable code further comprises code to perform:
   calculating a flow rate vector from the temperature difference detected by a first temperature sensor element and a second temperature sensor element; and
   in response to the flow rate vector being from a predetermined direction, determining that the movement of air molecules is noise and the user is not present within the user space.

* * * * *